United States Patent [19]

Elmer et al.

[11] Patent Number: 4,491,392

[45] Date of Patent: Jan. 1, 1985

[54] ELECTROCHROMIC DEVICE WITH POROUS GLASS ELECTROLYTE

[75] Inventors: Thomas H. Elmer; Francis P. Fehlner, both of Corning, N.Y.

[73] Assignee: Corning Glass Works, Corning, N.Y.

[21] Appl. No.: 378,780

[22] Filed: May 17, 1982

[51] Int. Cl.³ .............................................. G02F 1/01
[52] U.S. Cl. .................................................. 350/357
[58] Field of Search ......................... 350/357; 340/785

[56] References Cited

U.S. PATENT DOCUMENTS 3,955,943  12/1976  Jasinski .................................. 350/357

FOREIGN PATENT DOCUMENTS 2504905  7/1976  Fed. Rep. of Germany ...... 350/357

Primary Examiner—Bruce Y. Arnold
Assistant Examiner—William Propp
Attorney, Agent, or Firm—K. van der Sterre

[57] ABSTRACT

An electrochromic device comprising a solid electrolyte, wherein the electrolyte consists of porous glass impregnated with a solid ion-conductive compound such as an alkali metal salt, is described.

4 Claims, No Drawings

ELECTROCHROMIC DEVICE WITH POROUS GLASS ELECTROLYTE

BACKGROUND OF THE INVENTION

The present invention relates to electrochromic devices exhibiting a reversible change in color or transparency upon the application of an electric field. Specifically, the invention relates to electrochromic devices incorporating a novel electrolyte layer consisting of a porous glass sheet containing a salt or other ion-conductive compound in the pore structure thereof.

U.S. Pat. No. 3,521,941 discloses an electrochromic device of the type wherein a thin layer of a selected inorganic oxide or other compound provides the electric-field responsive electrochromic characteristic. Included in the device is an adjoining layer, called a current-carrier-permeable insulator, which constitutes the electrolyte or source of mobile ions for the operation of the device. Plastics as well as metal oxides, sulfides, fluorides, and nitrides are mentioned as suitable electrolyte materials.

It has been proposed to use colorless solid ionic conductors as electrolytes in electrochromic devices. Hence, U.S. Pat. No. 3,712,710 suggests the use of aluminum oxide combined with an alkali or alkaline earth metal oxide such as $Na_2O$, $K_2O$ or $MgO$ to provide the electrolyte film.

Faster response in electrochromic devices containing films of $WO_3$ and/or $MoO_3$ as the electrochromic layer has been obtained by using liquid or gel electrolytes, typically based on sulfuric acid. U.S. Pat. No. 3,708,220 suggests a gelled acid electrolyte of this type, while U.S. Pat. No. 4,021,100 discloses the use of a porous insulating layer of alumina, silica or glass saturated with a liquid acid electrolyte. U.S. Pat. No. 4,175,837 proposes the use of liquid electrolytes containing selected sodium or lithium salts.

Although liquid and gel electrolytes such as described in the foregoing patents impart good electrochromic performance, problems relating to the handling and containment of the liquid or gel remain. In addition, the preferred $WO_3$ electrochromic materials are attacked by acidic electrolyte materials, limiting the utility of strong acids for this application.

A newer proposed class of solid electrolytes, disclosed in U.S. Pat. No. 3,995,943, includes certain electrically insulating silver compounds permeable to silver ions. An example of such an electrolyte is $Ag_4RbI_5$. U.S. Pat. No. 4,106,862 suggests the use of ionic conductors of the formula $Na_{1-x}Zr_2Si_xP_{3-x}O_{12}$, wherein x ranges from 0.8 to 2.4, as electrically insulating, sodium ion-conducting electrolyte materials. However, these electrolytes are relatively expensive to prepare.

It is therefore a principal object of the present invention to provide an electrochromic device incorporating a new solid electrolyte material offering good electrochromic response when used with known electrochromic materials.

It is a further object of the invention to provide an electrochromic device comprising a porous glass sheet as the electrolyte matrix.

Other objects and advantages of the invention will become apparent from the following description thereof.

SUMMARY OF THE INVENTION

The present invention provides an electrochromic device with a completely solid electrolyte, thus avoiding the problem of liquid containment present in prior art devices incorporating liquid electrolyte materials. The solid electrolyte of the invention exhibits improved durability and ease of fabrication when compared with many of the solid electrolytes of the prior art.

Broadly described, the electrochromic device of the invention comprises a layer of an electrochromic material which constitutes the light modulating layer of the device, a counterelectrode, typically in the form of a layer, for applying an electric field across the electrochromic material, and a solid, ion-conducting electrolyte, which is an electronic insulator, positioned between and in contact with the electrochromic material and the counter-electrode which includes a sheet of porous glass. This porous glass sheet, which is composed, for example, of porous 96% silica glass or the like, contains an ion-conductive inorganic compound such as n alkali metal salt dispersed throughout the pore structure thereof. This inorganic compound is the source or sink for mobile ions which must move across the electrochromic layer/electrolyte layer boundary to increase or decrease the absorbance of the electrochromic material.

Although a minor amount of adsorbed water in the pore structure of the porous glass electrolyte appears necessary for the proper operation of the electrochromic device, the electrolyte remains solid so that no problem of liquid containment or loss is presented. Moreover, hazards due to the acidity of conventional $H_2SO_4$-containing electrolytes are entirely avoided.

DETAILED DESCRIPTION

The particular porous glass selected for use in accordance with the invention is not critical. However, the preferred materials are porous high-silica glasses such as the commercially available porous 96% silica glasses. Glasses of this type are generically described in U.S. Pat. No. 2,106,744, and may be characterized as high-silica materials comprising a multiplicity of interconnected, submicroscopic pores extending throughout the volume of the material. This structure results from the removal, by leaching, of a minor interconnected glassy phase from the material, the minor phase having been earlier developed in the material by phase-separation during heat treatment.

If the teachings of the above-mentioned patent are followed, the porous glass products will comprise at least about 94% silica by weight (the commercially available products contain at least 96% silica by weight), with the remainder of the composition including minor amounts of $Al_2O_3$, $B_2O_3$ and alkali metal oxides. The designation "96% silica glass" will hereinafter be used to identify all such porous glasses without particular regard for the exact silica content thereof.

Extensive preparation of the porous glass prior to impregnation with the selected salt or other compound to form the electrolyte is not required. In some cases, it may be desirable to remove adsorbed water from the pore structure of the glass, as where a high-temperature impregnation process is to be utilized. In this circumstance, simply heating the glass to about 180° C. for a few minutes is normally sufficient to substantially completely dry the pore structure of the glass.

Impregnation of the porous glass typically involves immersing the glass into a solution of the selected salt or compound, most frequently a saturated aqueous solution thereof. Alternatively, the glass can be immersed directly in a molten salt, or the salt or compound can be produced in situ by impregnating the glass with a precursor compound and then reacting the precursor with a suitable reagent to form the electrolyte compound directly within the pore structure of the material.

Where an aqueous solution has been employed as the vehicle for impregnating the glass, it is desirable to remove residual solvent from the pore structure of the glass prior to use. This may be accomplished by heating the glass to temperatures on the order of 100° C. to dry the salt phase within the pore structure of the glass.

It is found that best operation of an electrolyte produced as described is assured if the glass is equilibrated with ambient air at mid-range humidity levels for 24 to 48 hours after thermal drying prior to use. This permits absorption of water by the electrolyte which significantly aids device operation. However, over-exposure to moist air should be avoided because it can result in loss of the salt or other compound from the pore structure of the glass. This is particularly true in the case of the very hygroscopic salts, such as, for example, lithium chloride, which appear to offer the best electrochromic performance in accordance with the invention.

After the impregnated porous glass has been prepared in accordance with procedures such as above described, electro-chromic, counterelectrode and electrical contact layers may be applied to the porous glass utilizing conventional film deposition techniques. For example, an electrochromic $WO_3$ film can be deposited on the glass by vacuum evaporation, and tin-doped indium oxide counterelectrode and electrical contact layers can be applied to the glass and to the electrochromic layer by sputtering or other suitable techniques. Electrical leads may then be attached to the counterelectrode and electrical contact layers by conventional techniques.

The invention may be further understood by reference to the following detailed examples illustrating the fabrication of electrolyte sheets and electrochromic devices in accordance therewith.

EXAMPLE I

A porous 96% silica glass plate about 1 mm in thickness and 1×¾ inches in area is selected for processing. This porous glass plate is immersed in a saturated aqueous solution of $Li_2SO_4$ at room temperature for 24 hours, removed and wiped to remove excess solution from the surface thereof, and then baked at 93° C. for four hours in an electric oven to remove residual water.

After drying and cooling, the porous glass plate is re-immersed in the $Li_2SO_4$ solution for an additional five hours, removed, and again wiped and baked to remove residual water. The $Li_2SO_4$ impregnated porous glass thus provided is then equilibrated with room air at about 50% relative humidity for about 24 hours, gaining about 4% by weight of adsorbed water when compared with the just-baked glass plate. This equilibrated plate is suitable for incorporation into an electrochromic device.

EXAMPLE II

A half-section of porous glass tubing, cut from a ⅜ inch-diameter porous glass tube having a wall thickness of about 1.2 mm, is selected for processing. This section is immersed in a saturated aqueous solution of $AgNO_3$ at 95° C. for one hour, removed, and immersed in concentrated HCl at room temperature for 25 minutes to react the acid with the silver nitrate and cause the precipitation of silver chloride within the pore structure of the glass. The glass is removed from the HCl, rinsed in distilled water, and baked at 100° C. for four hours to remove moisture and unreacted HCl from the pore structure of the glass. The baked glass is then equilibrated with room air as in Example I for about 24 hours, and is thereafter suitable for use as an electrolyte layer in an electrochromic device.

EXAMPLE III

A section of porous glass tubing such as described in Example II above is selected for processing. The section of tubing is immersed for four hours at 97° C. in an aqueous solution of LiCl containing about 50% salt by weight. The section is then removed, washed for one minute in distilled water at 24° C., and dried by heating to 105° C. for about 45 minutes. The dried LiCl-impregnated glass is then equilibrated in room air as in Example I for about 5 hours, after which a moisture pick-up of about 7% by weight is measured. The impregnated glass thus provided is suitable for use as an electrolyte layer in an electrochromic device.

EXAMPLE IV

A section of a porous glass plate having a thickness of about 0.5 mm and an area of about 1×1 inches is selected for processing. This plate is heated to about 145° C. in a heating interval of 52 minutes to remove water from the pore structure thereof, and is then immersed in molten lithium acetate for 23 minutes at 98° C. to fill the pore structure of the glass with the molten salt. The plate is then removed, rinsed in distilled water, and wiped to remove excess liquid; baking to remove water from the pore structure is not required. The plate thus provided is transparent rather than opaque, and is suitable for use as an electrolyte in a transparent electrochromic device.

EXAMPLE V

A porous glass plate such as described in Example IV above is selected for processing. This plate is heated to 145° C. as described in Example IV, and is then immersed in molten $LiNO_3$ at 325° C. for an immersion interval of 20 minutes to fill the pore structure of the glass with the molten salt. The impregnated plate is then removed from the salt, cooled, and rinsed in distilled water to remove excess salt from the surface. After equilibration with room air for 16 hours, as in Example I, the plate is suitable for use as an electrolyte sheet in an electrochromic device.

EXAMPLE VI

A porous glass plate prepared in accordance with the procedure of Example IV is immersed in a molten salt mixture comprising 7.8 g $Li_2SO_4.H_2O$ and 25 g $LiNO_3$ for 20 minutes at 325° C. to fill the pore structure of the glass with the molten salt. The glass is then removed from the melt, cooled, rinsed with distilled water and wiped dry. After equilibration with room air for about 16 hours as in Example I, the impregnated plate is suitable for use as an electrolyte sheet in an electrochromic device.

EXAMPLE VII

A porous glass plate such as described in Example IV above is selected for processing. This plate is immersed in a solution containing a dissolved lithium phosphate glass, the glass having a composition, by weight, of about 19.6 parts $Li_2O$, 4.0 parts $SiO_2$, and 75.5 parts $P_2O_5$, the dissolved glass making up about 23% by weight of the aqueous solution. Immersion is for 24 hours at room temperature.

Following immersion, the plate is simply removed from the solution, wiped, and dried under ambient conditions. It is transparent and suitable for use as an electrolyte sheet in an electrochromic device.

Electrochromic Device Fabrication

Electrochromic devices are prepared incorporating electrolyte sheets produced in accordance with the above described examples utilizing the following procedure. Electrochromic layers consisting essentially of $WO_3$ are applied to one surface of each electrolyte sheet by vacuum evaporation. In a typical process, the electrolyte sheet is placed in an evaporation chamber over an evaporation boat containing a quantity of yellow tungstic oxide, the chamber is evacuated, and the evaporation boat is heated to volatilize the oxide. Evaporation is continued at a pressure of about $5 \times 10^{-5}$ Torr and at an evaporation rate sufficient to deposit the oxide at 5 Å/sec. on the glass, until a tungsten oxide film about 3,000 Å thick has been formed on one surface of the glass. Evaporation is then halted and dry nitrogen is admitted to the chamber.

A counterelectrode of tin-doped indium oxide is then applied to the uncoated surface of the electrolyte sheet, and a contact electrode also consisting of tin-doped indium oxide thereafter applied over the tungsten oxide electrochromic layer, both electrode layers being applied by RF sputtering. Each side of the sheet is exposed in a sputtering unit to a target consisting of tin-doped indium oxide, containing 9 mole percent tin oxide and the remainder indium oxide. Material from the target is RF sputtered onto each surface of the glass at 0.6 kv utilizing 150 W forward power and 15 W reflected power, without cooling of the glass sheet and in an argon-oxygen atmosphere containing 0.23% $O_2$ by volume at a pressure of $6 \times 10^{-3}$ Torr. Under these conditions, a sputtered tin-doped indium oxide (ITO) film about 1000 Å thick is provided on each side of the impregnated glass sheet in about 20 minutes.

Electrochromic devices thus prepared are provided with electrical leads by attachment with conductive silver paint, and are then tested for electrochromic response by applying electric potentials across the leads. Table I below reports the performance of electrochromic devices incorporating impregnated electrolyte layers such as described in Examples I–VII above. Included in Table I are a description of the salt or compound present in the pore structure of the glass, the appearance of the electrolyte sheet, and a summary of the electrochromic response of the device including the negative and positive voltages applied to cause electrochromic darkening and bleaching, respectively, the current across the device in milliamps, the color of the device after electrochromic darkening, and the time required to cause an electrochromic darkening response which could be easily perceived.

TABLE I

| Example | Pore Compound | Electrolyte Appearance | ELECTROCHROMIC RESPONSE SUMMARY | | | |
|---|---|---|---|---|---|---|
| | | | Volts | Current (mA) | Color | Time (min.) |
| I | $Li_2SO_4$ | Opaque white | ±25 v | 0.1 | Dark blue-gray | ½ |
| II | AgCl | Opaque white | ±25 v | 0.6 | Light blue | ¼ |
| III | LiCl | Opaque white-dry Transparent-wet | ±5 v | 0.1 | Blue | 1 |
| IV | $LiC_2H_3O_2$ | Transparent | ±50 v | 0.02 | Gray-blue | 1 |
| V | $LiNO_3$ | Opaque white | ±100 v | 1 | Blue* | 1/60 |
| VI | $LiNO_3/Li_2SO_4$ | Opaque white | ±20 v | 0.05 | Blue | ½ |
| VII | Lithium phosphate glass | Transparent | −25 v | 0.004 | Blue | 58 |

*Under high humidity conditions

Although porous glass not incorporating any electrolyte salt or compound in the pore structure thereof can support some electrochromic response in tungsten oxide provided with counterelectrode and electrical contact layers as above described, such response is attributed simply to the presence of adsorbed moisture in the pore structure of the glass and is not sufficient to provide good contrast between the darkened and undarkened sections of an electrochromic device. Hence, the use of selected salts or other ion-conductive compounds within the pore structure of the glass as above described provides good electrochromic response characteristics in devices incorporating a solid electrolyte sheet, while at the same time avoiding the problems of liquid containment encountered with liquid-impregnated materials.

We claim:

1. An electrochromic device comprising a layer of an electrochromic material as a light-modulating layer, a counterelectrode layer, and a solid electrolyte layer between and in contact with both the electrochromic layer and the counterelectrode layer, characterized in that the solid electrolyte layer consists of a sheet of porous glass impregnated with a solid, ion-conductive silver or alkali metal compound.

2. An electrochromic device in accordance with claim 1 wherein the sheet of porous glass is composed of a 96% silica glass.

3. An electrochromic device in accordance with claim 2 wherein the solid, ion-conductive silver or alkali metal compound is a salt selected from the group consisting of ionic salts of silver and lithium.

4. An electrochromic device in accordance with claim 3 wherein the salt is hygroscopic.

* * * * *